United States Patent [19]
Chen et al.

[11] Patent Number: 6,027,350
[45] Date of Patent: Feb. 22, 2000

[54] EJECTING MECHANISM FOR CARD CARTRIDGE CONNECTOR

[75] Inventors: Chaur-Shiuh Chen, Chia-I; Kun-Tsan Wu, Tu-Chen, both of Taiwan

[73] Assignee: Hon Hai Precision Ind. Co., Ltd., Taipei Hsien, Taiwan

[21] Appl. No.: 09/178,370

[22] Filed: Oct. 23, 1998

[30] Foreign Application Priority Data

Oct. 23, 1997 [TW] Taiwan ................................. 86218088

[51] Int. Cl.⁷ ................................................. H01R 13/62
[52] U.S. Cl. ............................................................ 439/159
[58] Field of Search ................................. 439/159, 152, 439/160, 157; 361/754

[56] References Cited

U.S. PATENT DOCUMENTS

| | | | |
|---|---|---|---|
| 5,152,697 | 10/1992 | Abe et al. ................................. | 439/152 |
| 5,299,946 | 4/1994 | Kusskabe ................................. | 439/159 |
| 5,368,493 | 11/1994 | O'Brien et al. .......................... | 439/160 |
| 5,421,737 | 6/1995 | Chen et al. .............................. | 439/157 |
| 5,588,527 | 9/1996 | Lin ........................................... | 439/155 |
| 5,871,365 | 2/1999 | Kajiura ..................................... | 439/159 |
| 5,899,763 | 5/1999 | Kajiura ..................................... | 439/159 |

*Primary Examiner*—Neil Abrams
*Assistant Examiner*—Chandrika Prasad

[57] ABSTRACT

An ejecting mechanism for use with a card cartridge connector comprises a casing integrally formed with the card cartridge connector. A push rod is movably disposed within the casing, a biasing tab is movably disposed within the housing. The biasing tab forms a mating face engaged with an actuating end of the push rod, and an ejecting face extending into a receiving slot defined within the card cartridge connector. Therefore, when the push rod is actuated, a card inserted within the receiving slot is ejected.

17 Claims, 9 Drawing Sheets

EJECTING MECHANISM FOR CARD CARTRIDGE CONNECTOR

FIELD OF THE INVENTION

The present invention relates to an ejecting mechanism, and more particularly to an ejecting mechanism for use with card cartridge connector whereby a card inserted therein can be ejected with a low manipulating force.

DESCRIPTION OF PRIOR ART

A card cartridge connector is integrally formed with an ejecting mechanism for ejecting a card inserted therein. U.S. Pat. Nos. 5,152,697, 5,470,241, 5,421,737, 5,492,481, and 5,299,946 disclose such ejecting mechanisms. Having a complicated configuration which result in high manufacturing costs.

SUMMARY OF THE INVENTION

An objective of this invention is to provide an ejecting mechanism having a simple configuration thereby reducing manufacturing costs.

Another objective of this invention is to provide an ejecting mechanism having an anti-disorientation means to prevent incorrect insertion of a card.

In order to achieve the objectives set forth, the ejecting mechanism in accordance to the present invention comprises a casing integrally formed with a housing. The ejecting mechanism includes a push rod movably disposed within the casing. A biasing tab actuated by the push rod is movably disposed within the housing. An ejecting face of the biasing tab extends into a receiving slot defined by the housing. Therefore, when the push rod is actuated, a card received in a receiving slot of the connector can be ejected therefrom.

These and additional objects, features, and advantages of the present invention will become apparent after reading the following detailed description of the preferred embodiments of the invention taken in conjunction with the appended drawings.

DETAILED DESCRIPTION OF THE PREFERRED EMBODIMENTS

Figure 1:
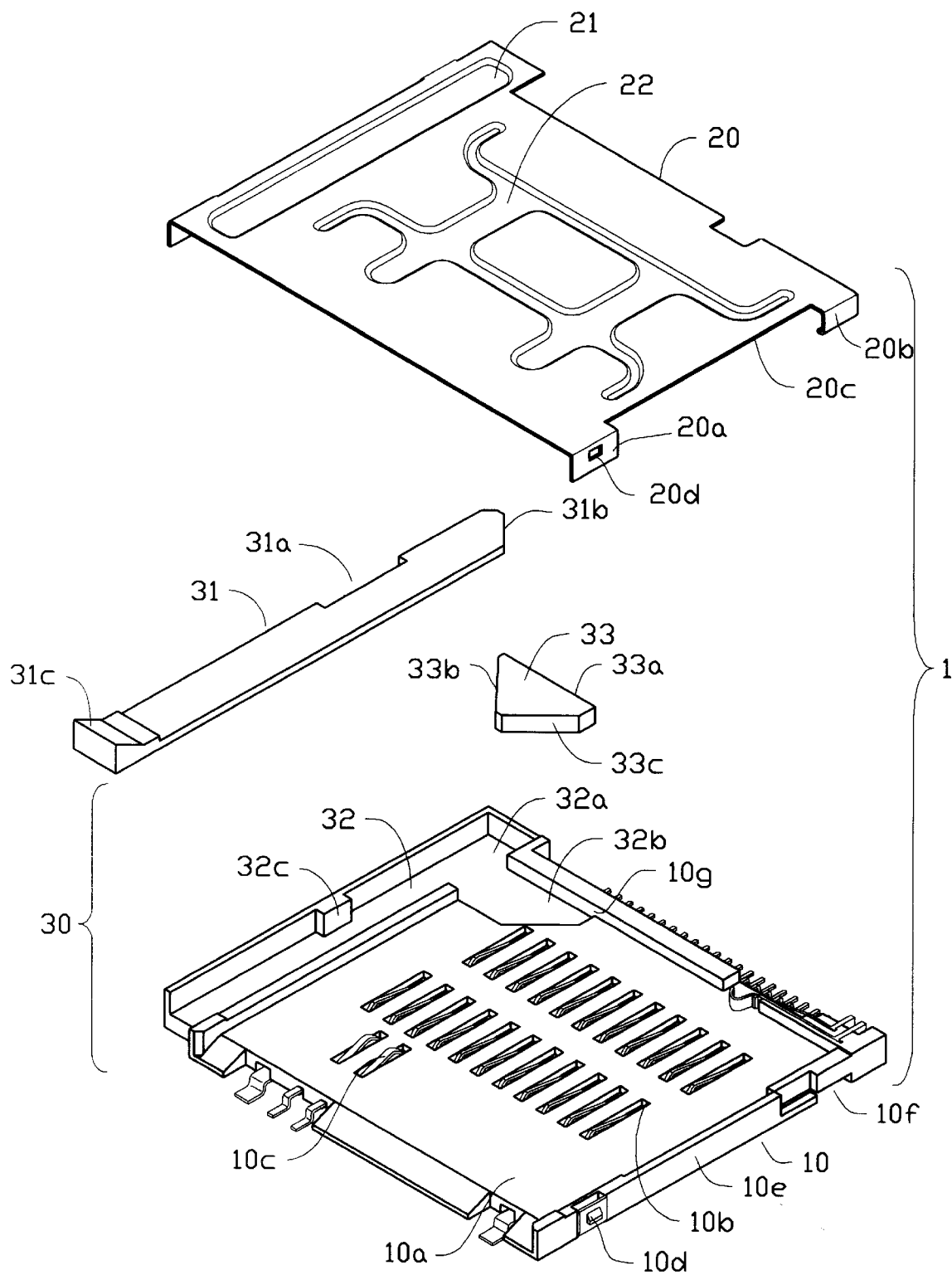
FIG. 1 is an exploded, perspective view of a card cartridge connector having an ejecting mechanism in accordance with the present invention.

Referring to FIG. 1, a card cartridge connector 1 includes a housing 10, a cover 20 adapted to attach to the housing 10, and an ejecting mechanism 30 assembled to the housing 10. The housing 10 has a top surface 10a and a bottom surface (not labeled) with a plurality of passageways 10b defined therebetween each receiving a terminal 10c therein. A tip (not labeled) of each terminal 11c projects beyond the top surface 10a. The housing 10 further forms a fastener 10d and a cutout 10f on a sidewall 10e thereof.

Figure 2:
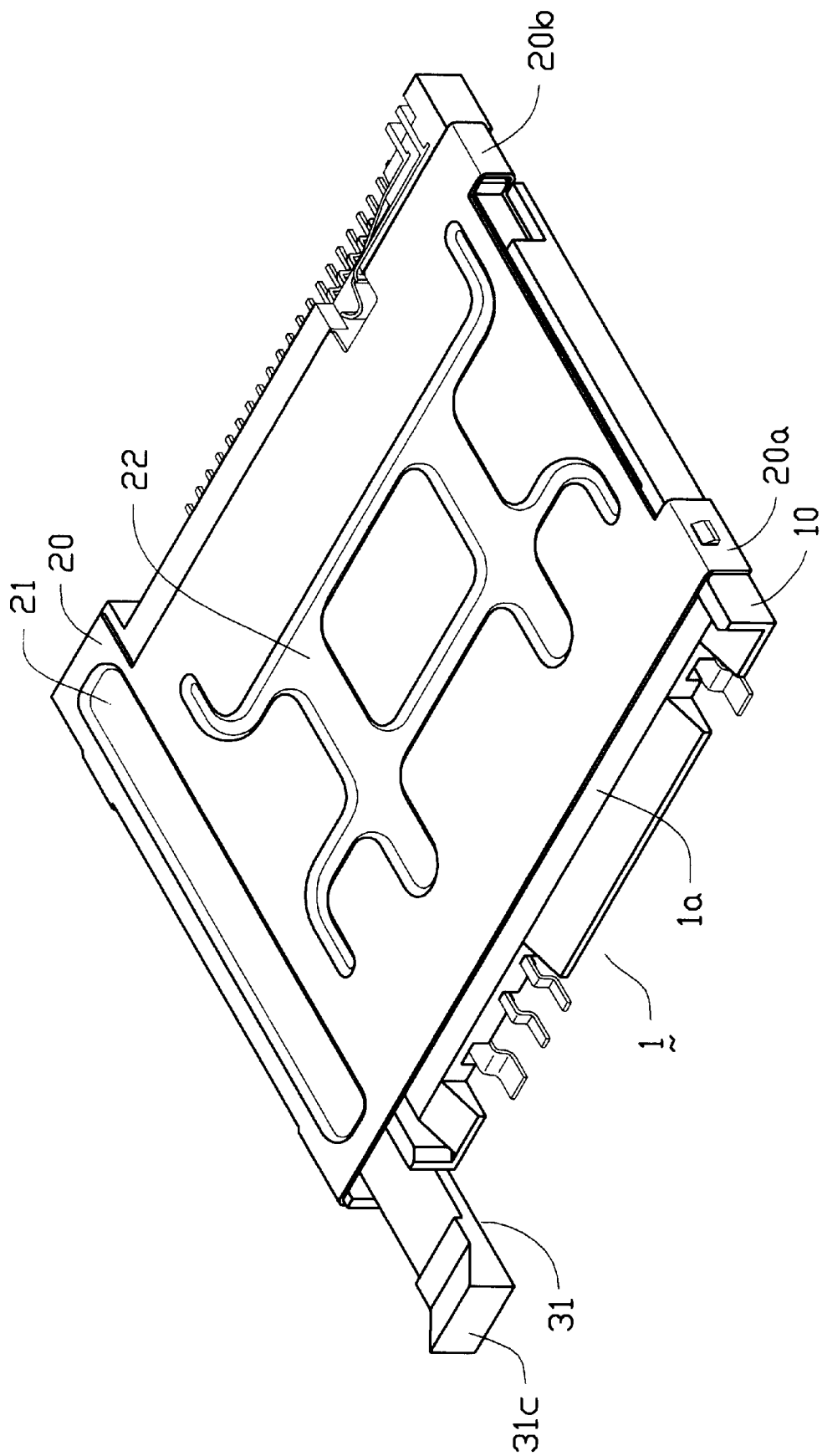
FIG. 2 is a perspective, assembled view of FIG. 1.

The cover 20 forms a fixing tab 20a having an opening 20d, and a clip 20b extending downward from a traverse side 20c thereof for engaging with the fastener 10d and the cutout 10f, respectively. The cover 20 further forms an elongate rib 21 and a patterned rib 22 projecting downward therefrom. When the cover 20 is attached to the housing 10, a receiving slot 1a (FIG. 2) will be defined therebetween. When a card is inserted into the receiving slot 1a, a golden finger on the card may establish an effective connection with the corresponding terminal 11c by means of the patterned rib 22.

The ejecting mechanism 30 includes a casing 32 integrally formed with the housing 10, a push rod 31 movably received within the casing 32, and a biasing tab 33 movably seated within the casing 32. The casing 32 defines an elongate groove 32a and a traverse groove 32b orthogonal to the elongate groove 32a. The push rod 31 and the biasing tab 33 are movably seated within the elongate groove 32a and the traverse groove 32b, respectively. A wedge 32c is formed in the casing 32 and extends into the elongate groove 32a.

The push rod 31 forms "an actuating end 31b" thereto and a head 31c for receiving an external force. The push rod 31 forms a cutout 31a for engaging with the wedge 32c thereby limiting linear movement of the push rod 31 within the elongate groove 32a. The biasing tab 33 has a triangular shape defining a sliding face 33a, a mating face 33b, and an ejecting face 33c. The mating face 33b engages with the actuating end 31b and the bottom wall 10g as the push arm 31 changes between an extended position and an actuating position.

Figure 3A:
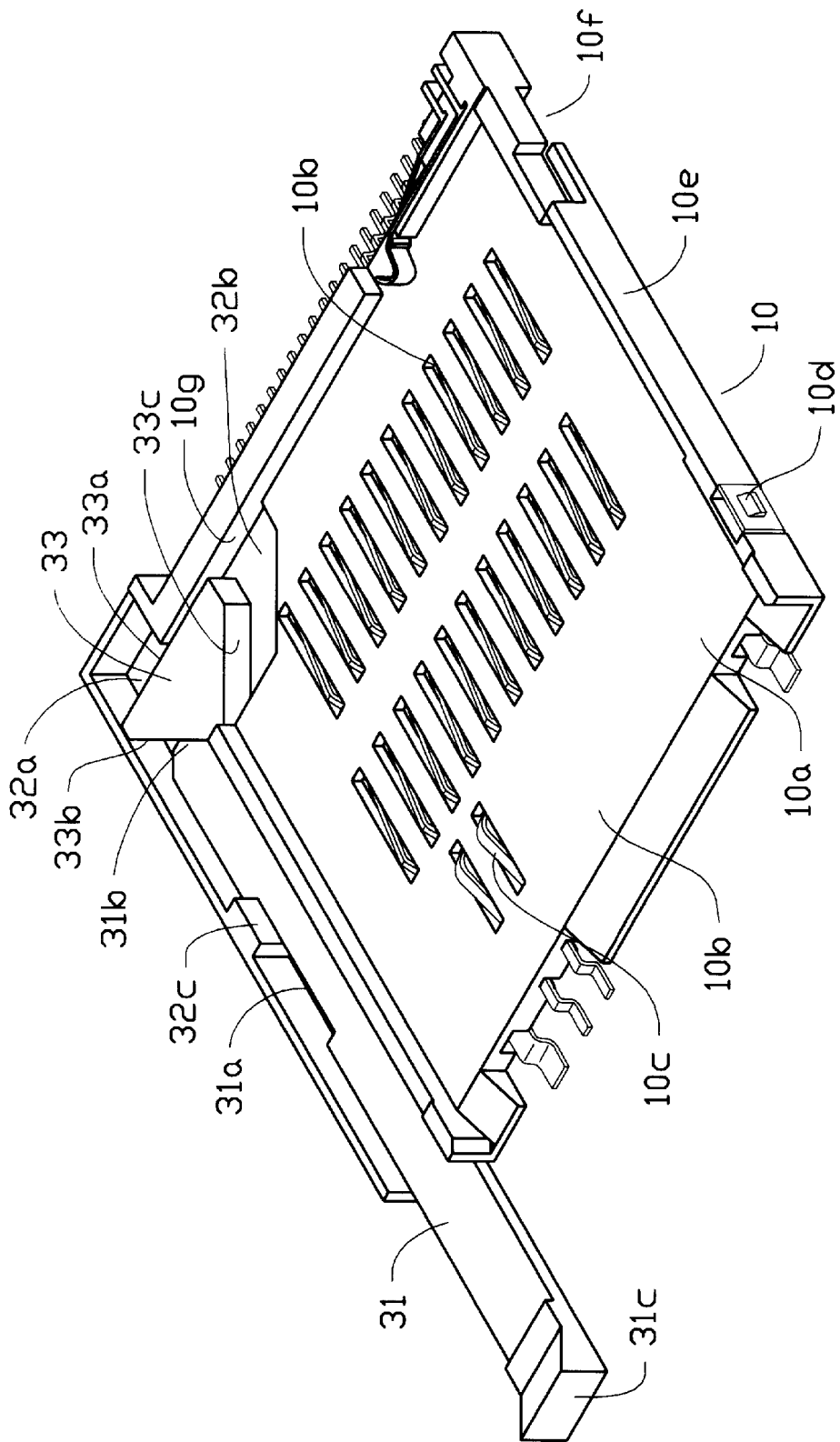
FIG. 3A is a perspective view of the card cartridge connector showing a biasing tab located at an extended position wherein a cover is removed therefrom for clarity.
Figure 3B:
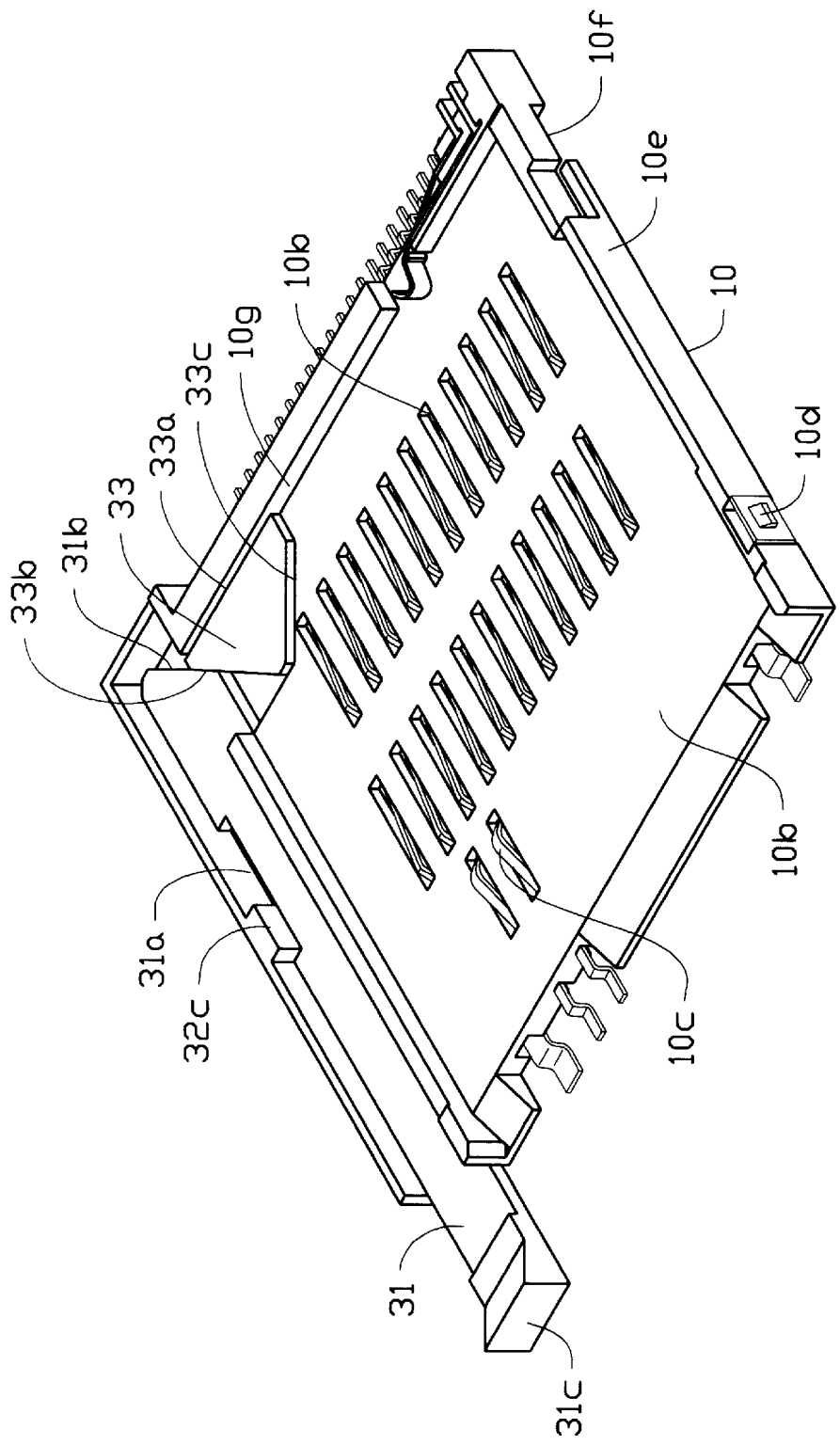
FIG. 3B is a perspective view of the card cartridge connector showing the biasing tab located at an actuated position.

Referring to FIG. 3A, an extended position of the push rod 31 and the biasing tab 33 is reached when a card (not shown) is inserted within the card cartridge connector 1. A corner of the card will push the actuating face 33c which urges the biasing tab 33 into the elongate groove 32a which causes the push rod 31 to extend from the card cartridge connector 1 due to the sliding engagement between the actuating end 31b of the push rod 31 and the mating face 33b of the biasing tab 33. Referring to FIG. 3B, to eject the card, a force is applied to the head 31c of the push rod 31 causing the actuating end 31b thereof to act on the mating face 33b thereby moving the biasing tab 33 into the traverse groove 32b.

As a result, a corner of the card will be pushed by the actuating face 33c of the biasing tab 33 thereby ejecting the card outward.

Figure 4:
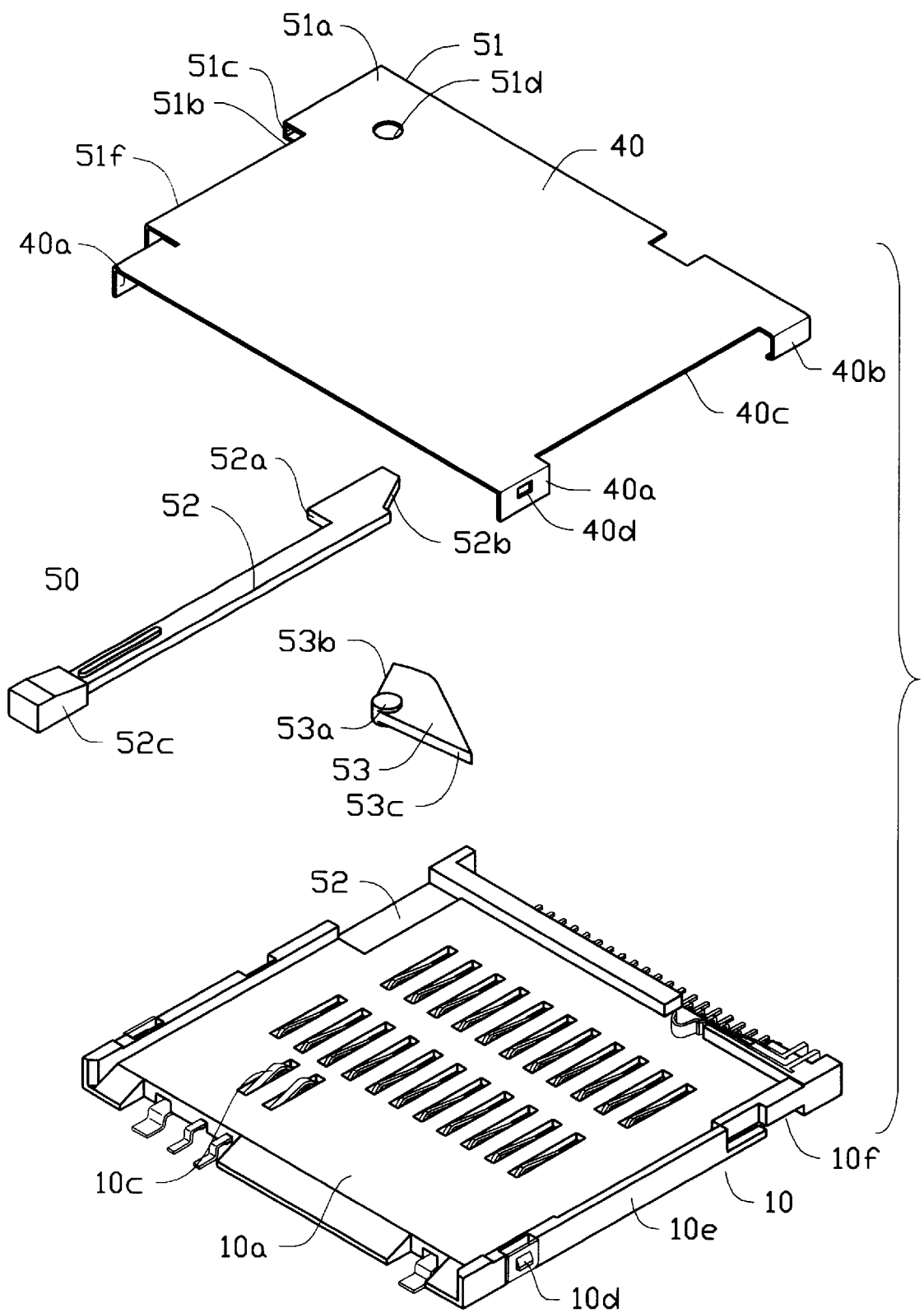
FIG. 4 is an exploded perspective view of the card cartridge connector having an ejecting mechanism in accordance with a second embodiment of the present invention.
Figure 5:
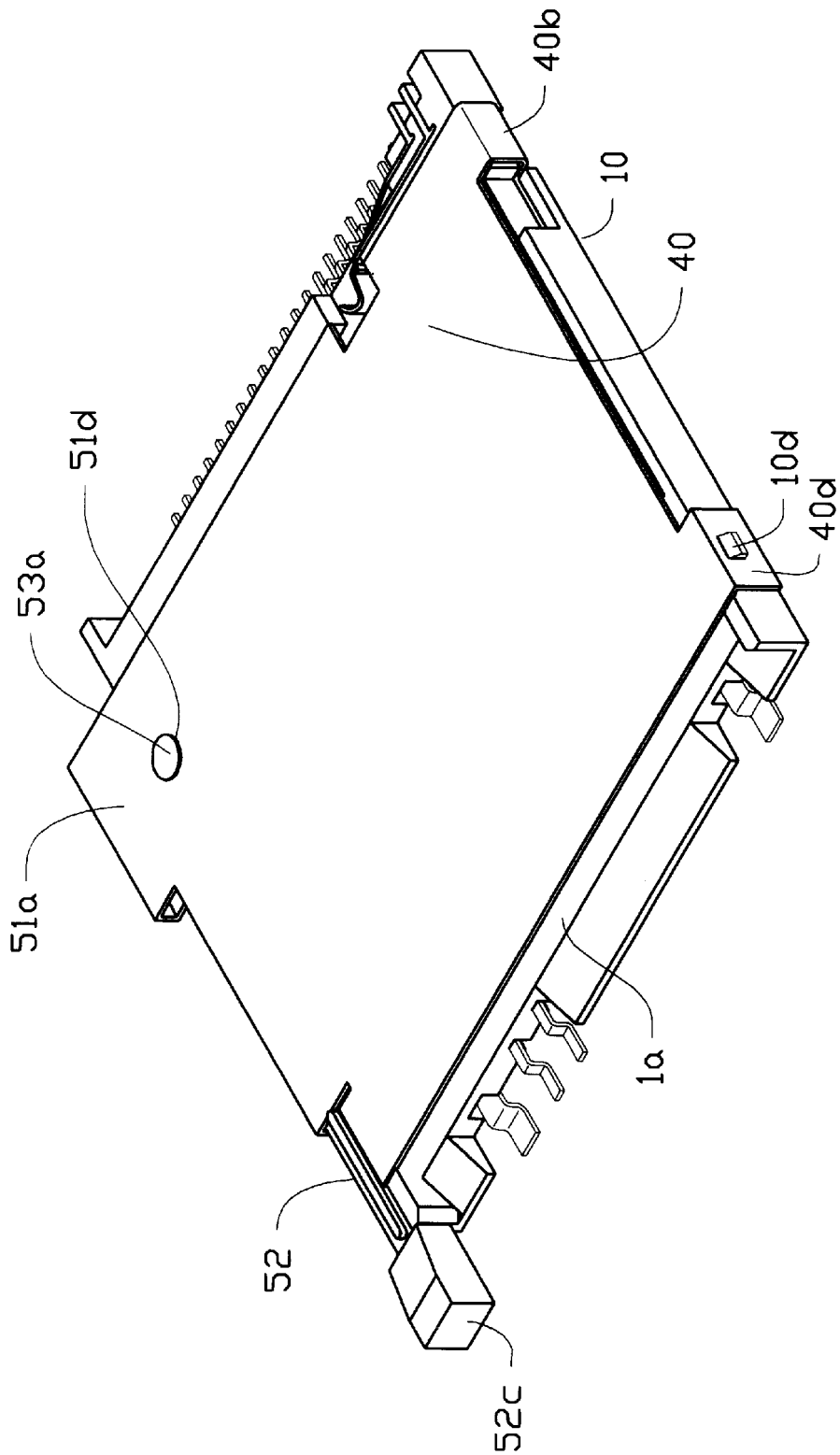
FIG. 5 is a perspective, assembled view of the card cartridge connector of FIG. 4.
Figure 6:
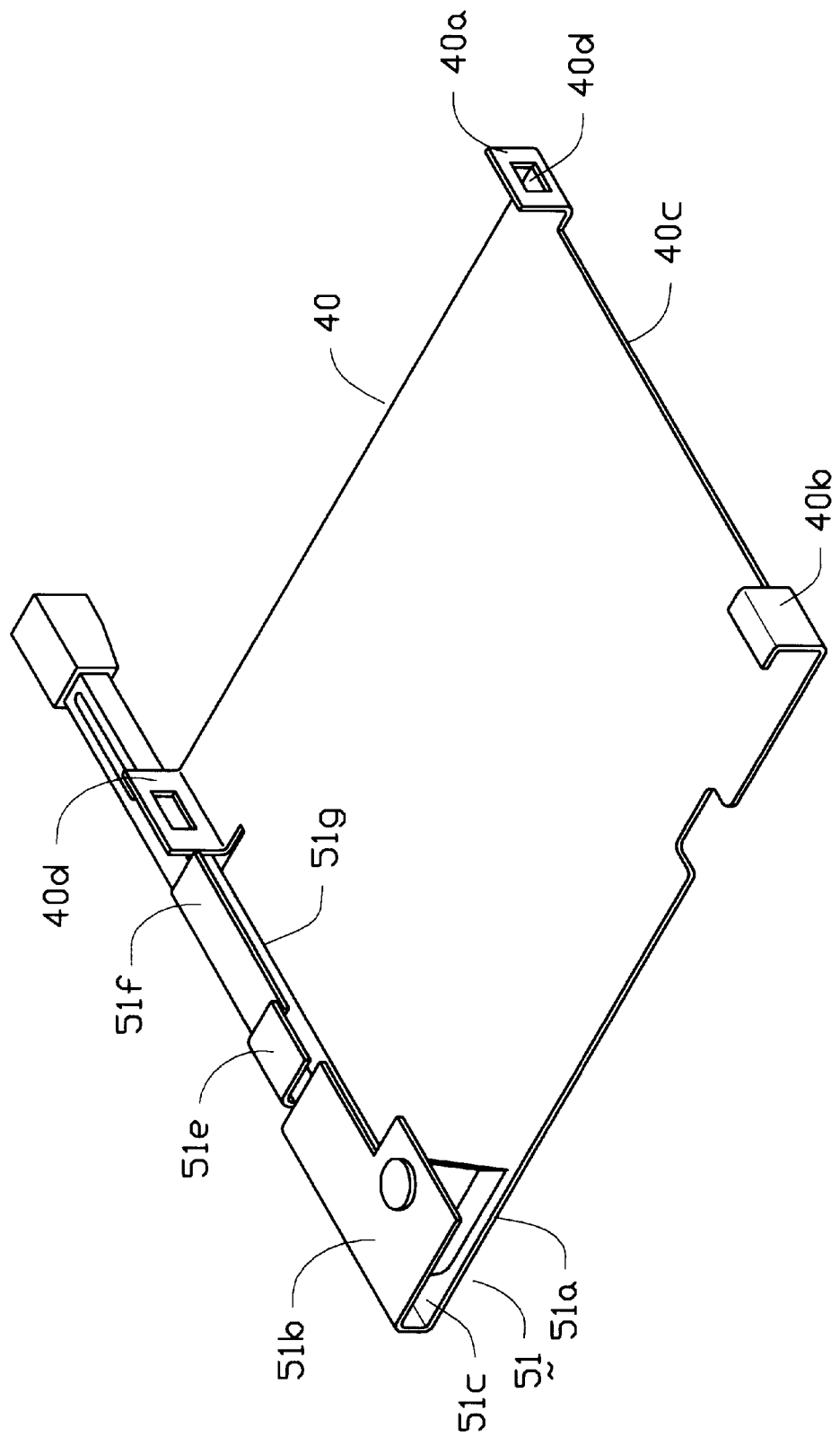
FIG. 6 is a perspective view of a cover with the ejecting mechanism assembled thereon.

Referring to FIGS. 4, 5, and 6, an ejecting mechanism 50 is integrally with a cover 40. The housing 10 has a configuration identical to the housing 10 of FIG. 1 except that a receiving recess 52 of the ejecting mechanism 50 is defined therein. The cover 40 is similar to the cover 20 of FIG. 1 except that a casing 51 for receiving the ejecting mechanism 50 is integrally formed thereon.

The cover 40 forms a pair of fixing tabs 40a extending from opposite sides thereof. Each fixing tab 40a defines an opening 40d therein. One of the fixing tabs 40a engages with the cutout 10f of the housing 10. A clip 40b extends downward from a traverse side 40c of the cover 40 for engaging with the fastener 10d of the housing 10. When the cover 40 is attached to the housing 10, a receiving slot 1a (FIG. 5) is defined therebetween. In this case, when a card is inserted into the receiving slot 1a, golden fingers on the card establish an effective connection with the corresponding terminals 10c.

The casing 51 includes a base substrate 51a and a first tab 51b cantilevered from a side of the substrate 51a defining a receiving chamber 51c with the base substrate 51a. The base substrate 51a and the first tab 51b each forms a pivot hole 51d therein and the pivot holes 51d are in alignment with each other. The casing 51 further includes a second tab 51e and a third tab 51f wherein the first, second and third tabs 51b, 51e, 51f together define a guiding slot 51g for receiving the push rod 52 therein. The fixing tab 40d serves to limit the push rod 52 within the guiding slot 51g. The ejecting mechanism 50 includes the push rod 52 having an ejecting end 52b and a head 52c for receiving a manipulating force applied thereon. The push rod 52 forms a step 52a for limiting movement of the push rod 52 within the guiding slot 51g. A biasing tab 53 includes a pin shaft 53a extending vertically therefrom. The pin shaft 53a is pivotably received in a corresponding pivot hole 51d whereby the biasing tab 53 is pivotably installed within the receiving chamber 51c. The biasing tab 53 forms a mating face 53b and an ejecting face 53c. When the cover 40 is attached to the housing 10, the ejecting face 53c extends into the receiving slot 1a defined between the cover 40 and the housing 10.

Figure 7A:
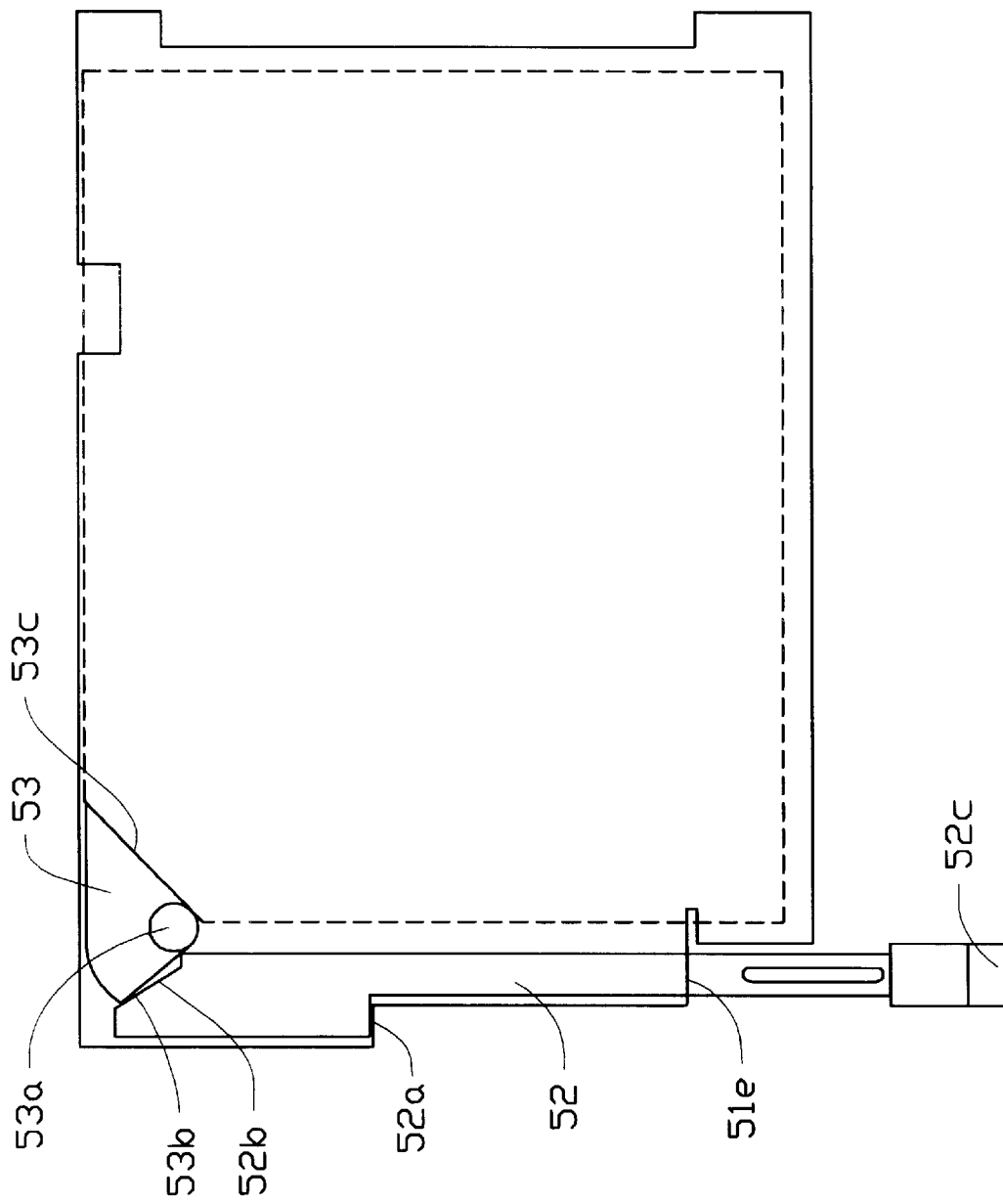
FIG. 7A is a top plan view of the cover with the biasing tab located at an extended position.
Figure 7B:
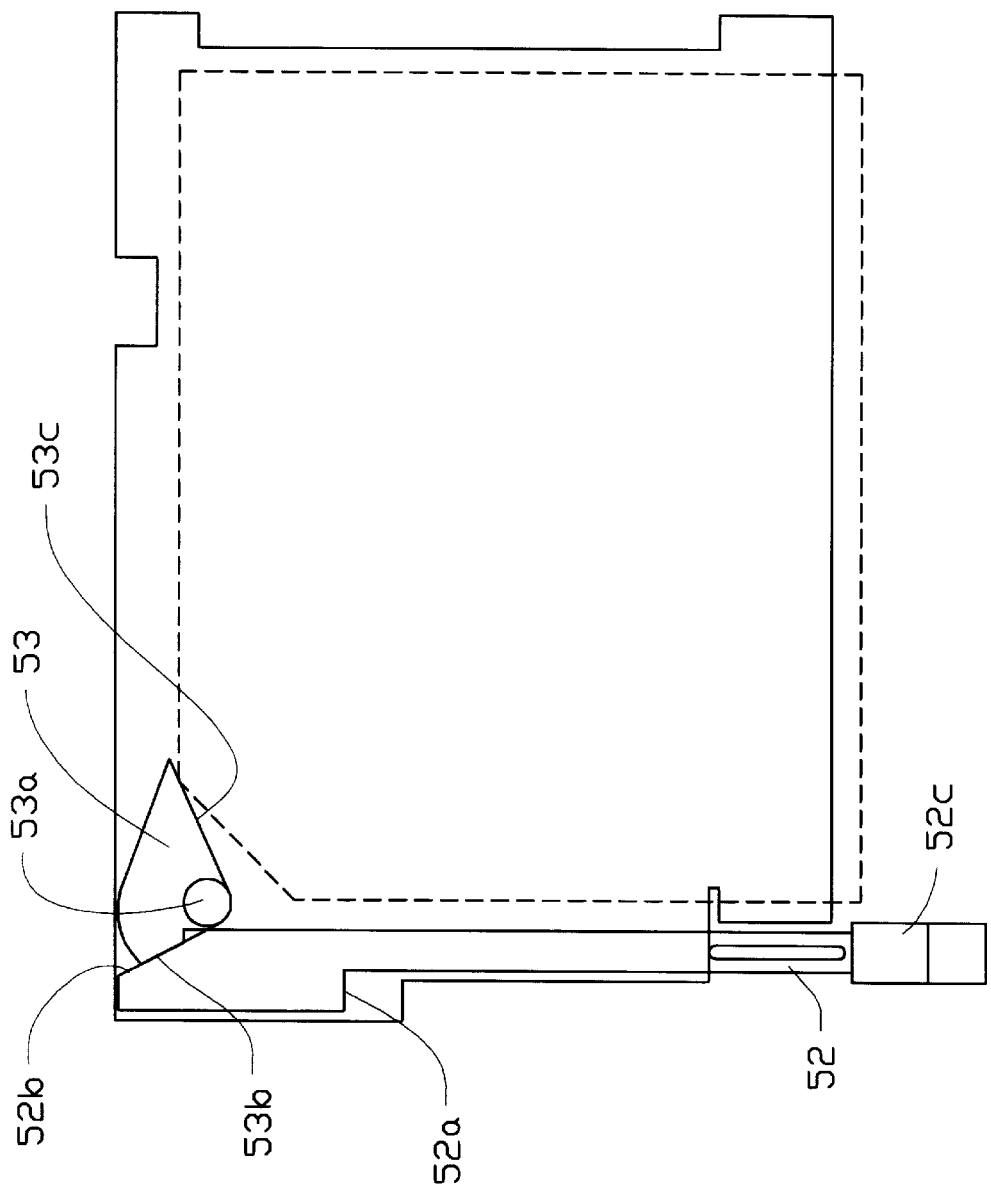
FIG. 7B is a top plan view of the cover with the biasing tab located at an actuated position.

Referring to FIGS. 7A and 7B, when a card (shown in dotted line) is inserted into the receiving slot 1a, a slanted corner (not labeled) will push the biasing tab 53 on its actuating face 53c until the card is completely seated. While the actuating face 53c is being pushed, the biasing tab 53 will pivot about on the pin shaft 53a. The pivoting movement of the biasing tab 53 will cause the mating face 53b to push the actuating end 52b of the push rod 52. Eventually, the push rod 52 is biased to extend out of the card cartridge connector 1.

To eject the inserted card, the user applies a force to the head 52c thereby moving the push rod 52 inward. While the push rod 52 is moving, the actuating end 52b pushes the mating face 53b whereby the biasing tab 53 pivots about the pin shaft 53a. The ejecting face 53c applies an outward force to the slant corner of the card thereby ejecting the card.

The ejecting face 53c also serves as an anti-disorientation means to ensure correct insertion of the card. If the card is improperly inserted, the card will not be seated since the correct corner will not align with the ejecting face 53c.

The main feature of the invention is to provide the biasing tab with a mating face and an ejecting face wherein the mating face is not directly connected to the push rod while adapted to be engageably actuated by the push rod, and the ejecting face can directly engageably actuate, or be actuated by, the card. Another feature of the invention is to provide the biasing tab with linear movement instead of the conventional pivotal movement popularly used in most so-called memory card connectors.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims. Therefore, persons of ordinary skill in this field are to understand that all such equivalent structures are to be included within the scope of the following claims.

We claim:

1. An ejecting mechanism for use with a card cartridge connector, comprising:
    a casing integrally formed with said card cartridge connector and defining an elongate slot and a traverse groove;
    a push rod movably disposed within said elongate slot of said casing; and
    a biasing tab movably disposed within said traverse groove of said casing, said biasing tab forming a mating face engaged with an actuating end of said push rod, and an ejecting face extending into a receiving slot defined within said card cartridge connector whereby when said push rod is actuated, said biasing tab is displaced linearly within said traverse groove such that a card inserted within said receiving slot is ejected.

2. An ejecting mechanism as recited in claim 1, wherein at least a part of said traverse groove communicating with said receiving slot of said card cartridge connector.

3. An ejecting mechanism as recited in claim 1, wherein said casing is integrally formed with a part of a housing of said card cartridge connector.

4. An ejecting mechanism as recited in claim 1, wherein said casing includes a base substrate and a first tab cantilevered from a side of said substrate defining a receiving chamber with said substrate.

5. An ejecting mechanism as recited in claim 4, wherein said base substrate and said first tab each forms a pivot hole wherein said pivot holes are in alignment with each other.

6. An ejecting mechanism as recited in claim 4, wherein said casing further includes a second tab and a third tab defining a guiding slot for the push rod therein.

7. An ejecting mechanism as recited in claim 4, wherein said biasing tab is pivotably disposed within said receiving chamber.

8. A card cartridge connector, comprising:
    a housing defining a plurality of passageways each receiving a terminal therein, said housing including at least a fastener on a sidewall thereof;
    a cover adapted to assemble to said housing, said cover including at least a fixing tab having an opening thereof for engaging with said fastener of said housing; and
    an ejecting mechanism for ejecting an inserted card within said card cartridge connector, including:
        a casing integrally formed with said housing and defining an elongate slot and a traverse groove;
        a push rod movably disposed within said elongate slot of said casing; and
        a biasing tab movably disposed within said traverse groove of said casing, said biasing tab forming a mating face engaged with an actuating end of said push rod, and an ejecting face extending into a receiving slot defined within said card cartridge connector whereby when said push rod is actuated, said biasing tab is displaced linearly within said traverse groove such that a card inserted within said receiving slot is ejected.

9. A card cartridge connector as recited in claim 8, wherein at least a part of said traverse groove communicating with said receiving slot of said housing.

10. A card cartridge connector as recited in claim 8, wherein said cover includes an elongate rib corresponding to said elongate groove thereby limiting said push rod within said elongate groove.

11. A card cartridge connector as recited in claim 8, wherein said cover includes a patterned rib projecting into said receiving slot.

12. A card cartridge connector as recited in claim 9, wherein said casing includes a base substrate and a first tab cantilevered from a side of said substrate defining a receiving chamber with said substrate.

13. A card cartridge connector as recited in claim 12, wherein said base substrate and said first tab each forms a pivot hole wherein said pivot holes are in alignment with each other.

14. A card cartridge connector as recited in claim 13, wherein said casing further includes a second tab and a third tab defining a guiding slot for the push rod therein.

15. A card cartridge connector as recited in claim 12, wherein said biasing tab is pivotably disposed within said receiving chamber.

16. A card cartridge connector for use with a card, comprising:

a housing with a plurality of contacts therein;

an ejecting mechanism for ejecting an inserted card out of the card cartridge connector, including:

a push rod moveable with regard to the housing in a front-to-back direction; and a biasing tab defining a mating face and an ejecting face wherein said mating face is not directly connected to the push rod but adapted to be engageably actuated by the push rod, and the ejecting face engageably actuates, or is actuated by, the card.

17. A card cartridge connector for use with a card, comprising:

a housing with a plurality of contacts therein;

an ejecting mechanism for ejecting an inserted card out of the card cartridge connector, including:

a push rod moveable with regard to the housing in a front-to-back direction; and a biasing tab including a mating face engageable with the push rod to have said biasing tab move in a lateral direction, said biasing tab further including an ejecting face engageable with the card to have said card move in the front-to-back direction.

* * * * *